May 11, 1926.
W. E. JOHNSTON
METHOD OF MANUFACTURING HOLLOW CHOCOLATE ARTICLES
Filed May 7, 1924
1,583,839
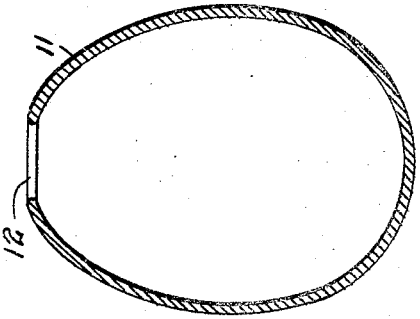
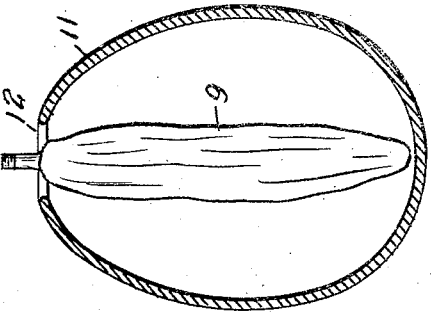
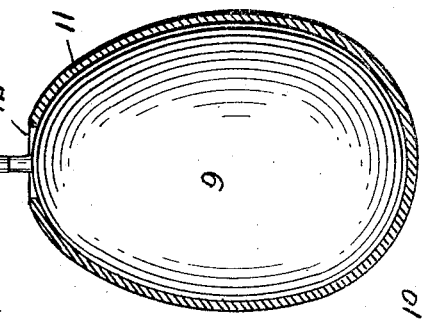
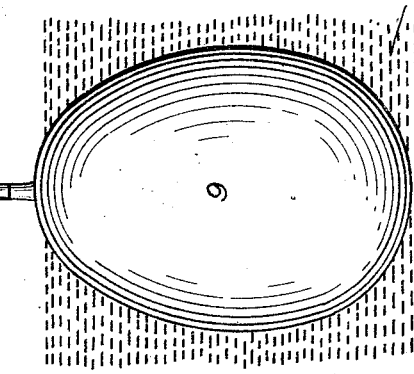
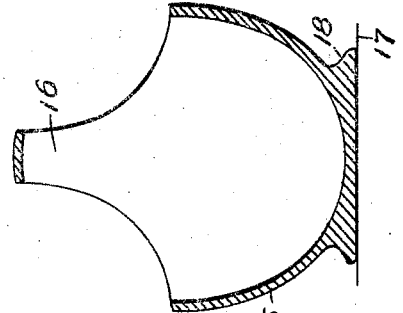
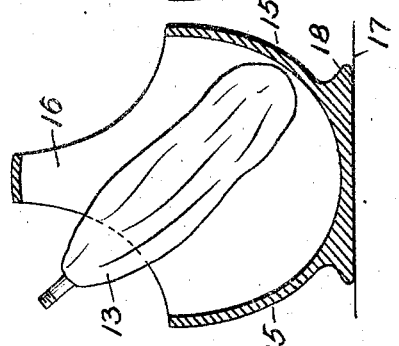
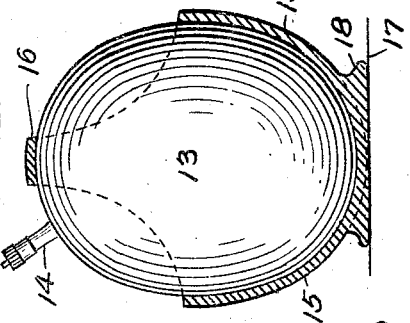
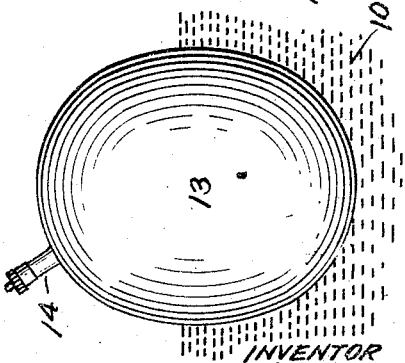
WITNESSES
J. Haleh Bradley.
INVENTOR
William E. Johnston
By Green and McCallister
His Attorneys Patented May 11, 1926.

1,583,839

UNITED STATES PATENT OFFICE.

WILLIAM E. JOHNSTON, OF PITTSBURGH, PENNSYLVANIA.

METHOD OF MANUFACTURING HOLLOW CHOCOLATE ARTICLES.

Application filed May 7, 1924. Serial No. 711,647.

This invention relates to candy making and more particularly to the manufacture of hollow chocolate articles such as Easter eggs, baskets and the like and an object of this invention is to provide a simple, cheap method of making such hollow chocolate articles.

I have discovered that if an inflated rubber form, for example, a toy balloon, is dipped in melted chocolate, a layer of chocolate will adhere to the balloon and, when the same has set and hardened, the balloon may be stripped from the shell thus formed by deflating the balloon.

In practicing my method of forming hollow chocolate articles such as Easter eggs, baskets, etc. I make use of this discovery and by utilizing collapsible elastic forms, such as toy balloons of the proper contour when inflated, I am enabled to quickly and cheaply manufacture the desired hollow chocolate articles.

The form or balloon, is preferably provided with a neck and an air valve in one end thereof, so that the balloon may be readily inflated and deflated when desired.

If an egg is to be made, the balloon is dipped into the melted chocolate to a depth sufficient to cover all of the same except a small area surrounding the said neck. The balloon is then lifted from the melted chocolate and the layer adhering thereto is allowed to set and harden. If the single layer is of sufficient thickness, the balloon may be deflated as soon as the chocolate becomes hard and then removed through the open end of the egg.

The act of deflating the balloon, I have found causes the same to pull or strip itself away from the inner surface of the egg and I have found that it is preferable to deflate the balloon gradually.

If a thicker coat of chocolate is desired than one dipping will provide, the shell after it has hardened and before deflating the balloon may be redipped and this may be carried on as many times as is necessary to secure the proper shell thickness.

If articles such as baskets are to be made the proper shaped balloon will be dipped deep enough in the melted chocolate to secure a shell which forms the body portion of the basket. The handle portion may then be formed by spreading melted chocolate over a portion of the upper surface of the balloon. After the chocolate has set and hardened, the balloon may be deflated and removed as heretofore described.

In making baskets or other articles where a base is desired, the inflated balloon with its adherent coat of chocolate may be placed on a supporting slab or table and the liquid or melted chocolate which has a tendency to run downwardly, will form a base.

In the drawings, Figure 1 diagrammatically illustrates a collapsible form or balloon 9 immersed in a kettle or other receptacle containing melted chocolate 10. Fig. 2 illustrates the form or balloon removed from the melted chocolate and with a shell 11 of chocolate adhering thereto, and covering the entire form except for an area at its top sufficient to form an opening 12 in the end of the shell. Fig. 3 illustrates the shell 11 with the deflated form 9 therein. Fig. 4 illustrates the shell of chocolate after the form or balloon has been removed therefrom.

Fig. 5 illustrates the method employed in forming baskets or the like. The form 13 having a neck 14 disposed at one side of the center thereof is dipped in the melted chocolate 10 to a sufficient depth to form the side walls 15 of a basket, as shown in Figs. 6, 7 and 8. After the form with the coating 15 adhering thereto has been removed from the melted chocolate, the handle 16 may be formed by spreading chocolate over a portion of the upper half of the form. The form with the adherent coat of chocolate thereon is then placed upon a table or slab represented by 17 and the soft chocolate which runs downwardly will form a base 18.

After the chocolate has set and hardened, the form or balloon 13 is deflated as shown in Fig. 7 and removed through one of the openings alongside of the handle.

After the shells, whether for eggs or baskets, have been formed, they may be decorated in any desired manner.

Having thus described my invention, what I claim is:—

1. The method of making hollow chocolate articles, which consists in coating an inflated elastic form with melted chocolate, in placing the coated form on a support before the coating is entirely hardened so that part of the coating will run downwardly therefrom to form a base, in cooling the coating to harden the same and then in deflating and removing the form from the hardened article.

2. The method of making hollow confections, which consists in coating an inflated elastic form with melted confection material, in supporting the coated form before the coating has entirely hardened in such manner that the coating will run downwardly therefrom to form a base and then in deflating and removing the form from the confection after the same has hardened.

In testimony whereof, I have hereunto subscribed my name this 2nd day of May, 1924.

WILLIAM E. JOHNSTON.